United States Patent [19]

Rupp et al.

[11] Patent Number: 4,847,327
[45] Date of Patent: Jul. 11, 1989

[54] SURFACE OR ELECTRICALLY ACTIVE COPOLYMERS OF POLY(4-SUBSTITUTED STYRENE/N-SUBSTITUTED MALEIMIDE)

[75] Inventors: Raymond W. Rupp, Greer, S.C.; Richard Vicari, Corpus Christi, Tex.; Donna L. Keene, Carrollton, Va.

[73] Assignee: Hoechst Celanese, Somerville, N.J.

[21] Appl. No.: 142,056

[22] Filed: Jan. 7, 1988

Related U.S. Application Data

[63] Continuation-in-part of Ser. No. 97,810, Sep. 16, 1987, abandoned.

[51] Int. Cl.⁴ .................. C08F 26/06; C08F 126/06; C08F 226/06
[52] U.S. Cl. .................. 525/326.7; 575/327.4; 575/327.5; 575/327.6; 430/311
[58] Field of Search .............. 525/327.6, 327.5, 327.4, 525/326.7, 187

[56] References Cited

U.S. PATENT DOCUMENTS 4,581,147 4/1986 Branch .................. 252/8.5 C
4,683,275 7/1987 Kato et al. .................. 526/262
4,797,450 1/1989 Dehm et al. .................. 525/326.7

Primary Examiner—Paul R. Michl
Assistant Examiner—Christopher D. RoDee
Attorney, Agent, or Firm—Herbert M. Hanegan; Donald R. Cassady

[57] ABSTRACT

A surface or electrically active material comprising an alternating copolymer having the formula

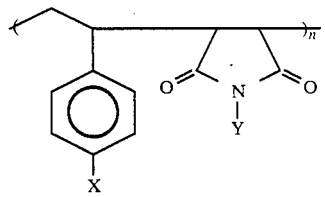

wherein X and Y oppositely consist of an electron accepting and an electron donating group or a hydrophobic group and an ionic or non-ionic hydrophilic group.

18 Claims, No Drawings

SURFACE OR ELECTRICALLY ACTIVE COPOLYMERS OF POLY(4-SUBSTITUTED STYRENE/N-SUBSTITUTED MALEIMIDE)

This application is a continuation-in-part of U.S. patent application Ser. No. 097,810 filed on Sept. 16, 1987 now abandoned, which is incorporated herein by reference.

BACKGROUND OF THE INVENTION

The present invention relates to novel polymers which are poly(4-substituted styrene/N-substituted maleimides) as well as a process for the production and use thereof. This polymer has been found to be useful in the preparation of various compositions such as adhesives and coatings, as well as surfactants and electrically and/or optically active materials. These polymers have the empirical formula

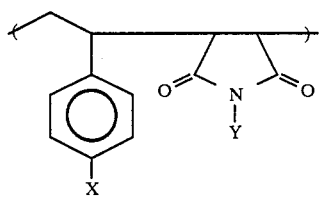

wherein X and Y oppositely consist of an electron accepting group and an electron donating group; or oppositely a hydrophobic group and an ionic or non-ionic hydrophilic group, and wherein the molecular weight ranges from about 1,000 to 500,000, preferably from about 5,000 to about 500,000.

It is known in the art, according to U.S. Pat. No. 4,663,268, to produce homopolymers of substituted maleimide copolymers similar to those described above but wherein the styrenic group is absent and the Y group is aryl. This patent teaches the usefulness of the aryl substituted materials as high temperature resistant binders for photoresists. U.S. Pat. Nos. 4,298,720 and 4,100,140 describe certain bismaleimides. U.S. Pat. No. 4,663,268 and EPO No. 187 517 describe certain maleimides having N-aryl substitution. EPO No. 140 273 describes photoresists employing certain maleimide containing copolymers. Japanese Pat. Nos. 79016995; 61218607 and 54101200 describe copolymers of vinyl phenols and maleic acid anhydride. U.S. Pat. No. 4,525,536 describes copolymers of aromatic maleimides, maleimides and vinyl aromatic monomers. Polyvinyl phenols are taught in U.S. Pat. Nos. 3,869,292 and 4,439,516. The invention provides compositions of matter derived from alternating copolymers of 4-acetoxystyrene and maleic anhydride. These compositions comprise perfectly alternating copolymers containing, as alternating side chains two different functional side chains. These side chains are selected on the basis of their ability to interact in a manner which produces useful properties. These non-exclusively include surface active materials in which the alternating side chains are hydrophobic and hydrophilic groups. The hydrophilic groups could be non-ionic or ionic in character. These materials find use as surfactants or as surface treatments and coatings especially for fibers and films. These copolymers are also useful as electrically or optically active materials in which the alternating groups are electron donors and acceptors. These materials find use as photoconductors, semiconductors and non-linear optical devices. The invention also provides a method for the synthesis of these materials based upon the differential reactivity of the substituted phenolic group and the anhydride group in the copolymer. Synthesis is by the formation of poly(4-hydroxy-styrene alt N-alkyl or aryl maleimides) by reaction of poly(4-acetoxystyrene alt maleic anhydride) with a primary amine. The hydroxystyrene groups in the maleimide copolymer are then further reacted with the desired substituent. Optionally the primary amine reaction provides the Y substituent.

SUMMARY OF THE INVENTION

The invention provides a surface active materials comprising an alternating copolymer having the formula

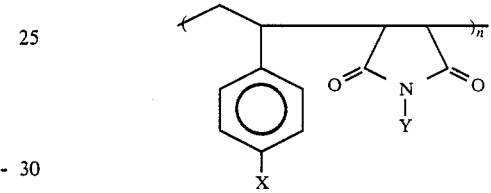

wherein X and Y oppositely consist of a hydrophobic group and an ionic or non-ionic hydrophilic group, wherein said hydrophobic group is selected from the group consisting of aliphatic, cycloaliphatic, aliphatic heterocyclic and $C_9$-$C_{18}$ amine groups; and wherein said hydrophilic group is selected from the group consisting of polyethylene oxide, co-polymers of ethylene oxide-propylene oxide, $C_2$-$C_{10}$ aliphatic and aromatic sulfonate, primary amino and carboxylic acid groups, wherein said copolymer has a molecular weight in the range of from about 1,000 to about 500,000.

Another aspect of the invention provides an electrically active material comprising an alternating copolymer having the formula:

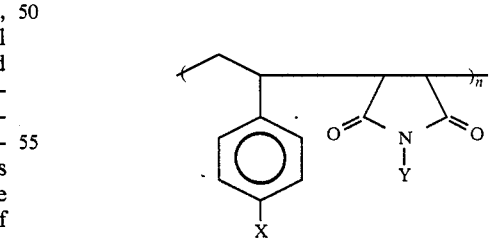

wherein X and Y oppositely consist of an electron accepting group and an electron donating group, wherein said copolymer has a molecular weight in the range of from about 1,000 to about 500,000.

The invention still further provides a method for producing a material comprising an alternating copolymer having the formula

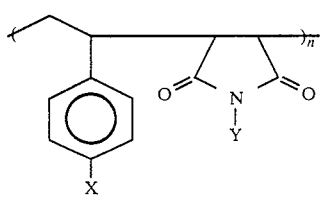

wherein X and Y oppositely consist of an electron accepting and an electron donating group; or a hydrophobic and an ionic or non-ionic hydrophilic group and wherein said copolymer has a molecular weight in the range of from about 1,000 to about 500,000, which method comprises reacting 4-acetoxystyrene with maleic anhydride in the presence of a free radical initiator to form a poly(4-acetoxystyrene alt maleic anhydride), then reacting this product with a primary amine to form a poly(4-hydroxystyrene/N-alkyl or aryl maleimide), and then 4-substituting said hydroxystyrene such that said N substituent and said 4-hydroxystyrene substituents oppositely consist of an electron accepting and an electron donating group or oppositely a hydrophobic and an ionic or non-ionic hydrophilic group.

DETAILED DESCRIPTION OF THE PREFERRED EMBODIMENT

In the process for the preparation of the foregoing copolymer, one begins by reacting a substituted or unsubstituted 4-acetoxystyrene with maleic anhydride in the presence of a free radical initiator. One preferred free radical initiator is azoisobutyronitrile. Other azo type initiators are also suitable. Other initiators non-exclusively include peroxides such as benzoyl peroxide, and di-butyl peroxide. It is predicted that essentially any free radical initiator will serve the same function. The foregoing pre-polymer is then reacted with a primary amine, preferably an aliphatic, cycloliphatic or aliphatic heterocyclic primary amine. Aryl amines may also find use but these are less preferred. The copolymer has a molecular weight in the range of from about 1,000 to about 500,000 or more preferably about 5,000 to about 50,000 and most preferably about 10,000 to about 50,000. A typical reaction sequence would be:

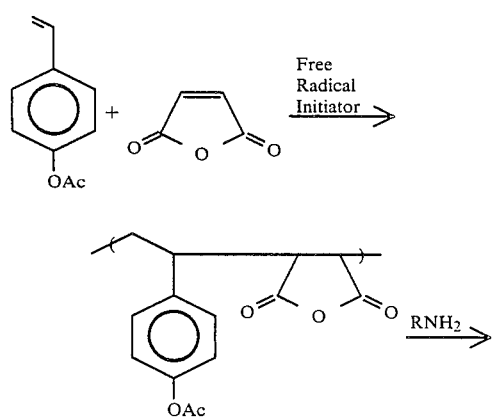

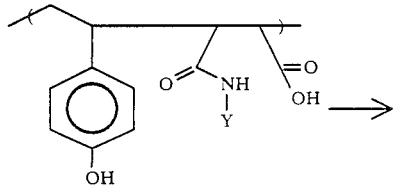

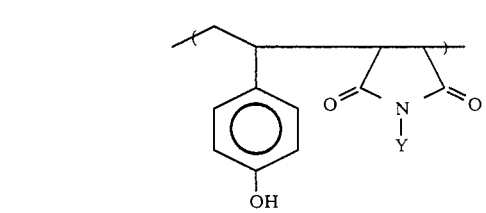

The X substituent is substituted onto the styrenic component to form the copolymer of the instant invention.

An important feature of the invention is that the alternating copolymer have oppositely functional side chain, i.e. X and Y, substituents. In one aspect of the invention the copolymer forms a surface active material wherein X and Y are oppositely hydrophilic and hydrophobic members. It does not matter for this invention which comonomer unit bears the hydrophilic and hydrophobic member. Non-exclusively, the hydrophobic groups include aliphatic, cycloaliphatic, aliphatic heterocyclic and $C_9$–$C_{18}$ amino groups. Hydrophilic groups non-exclusively include polyethylene oxide, copolymers of ethylene oxide-propylene oxide, $C_2$–$C_{10}$ aliphatic and aromatic sulfonate, primary amino and carboxylic acid groups. In the alternative, the X and Y substituents may be electrically or optically active and are alternating electron donating and accepting groups. Such may form organic semiconductors, liquid crystals, photoconductors and non-linear optical devices. One most preferred electron donor is N,N-dimethyl phenylene diamine. Other preferred electron donors non-exclusively include alkoxy anilines, substituted aromatic amines and dimethoxy benzoic acid. One preferred electron acceptor is 3,5-dinitro benzoic acid. Another preferred election acceptor is 3,5-dinitro aniline. The following examples are illustrative of the invention but it is understood that the invention is not limited thereto.

EXAMPLE 1

47 g of 4-acetoxystyrene monomer, 28.2 g of maleic anhydride and 0.75 g azo isobutyronitrile are polymerized in 250 ml of tetrahydrofuran for 24 hours at 70° C. The reaction product is cooled to room temperature and precipitated in 2 l of methanol. The white polymer is filtered and air dried to yield 71 g of poly (4-acetoxystyrene/maleic anhydride). 5 g of poly(4-acetoxystyrene/maleic anhydride), 1.4 g propyl amine and 50 ml N-methyl pyrrolidone is stirred at 75° C. for 1 hour and then at 160° C. for 15 hours. The polymer is isolated by precipitating with 500 ml water and filtered to yield

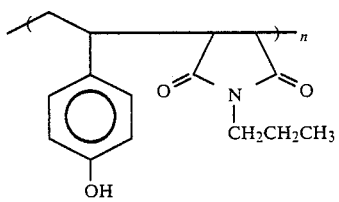

This intermediate is then reacted with ethylene oxide to yield:

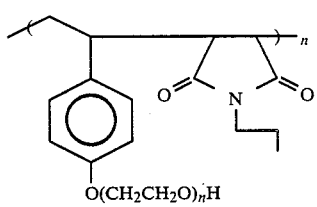

EXAMPLE 2

Example 1 is repeated using 50 g of poly(4-acetoxystyrene/maleic anhydride), 18.8 g cyclohexylamine and 200 g N-methyl pyrrolidone. The reaction proceeds at 75° C. for 1 hour then 150° C. for 24 hours. The following polymer is obtained by precipitating into water:

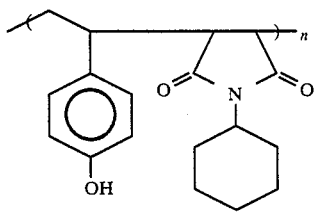

This intermediate is then reacted with ethylene oxide to yield:

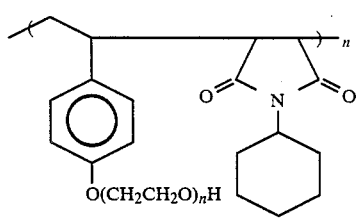

EXAMPLE 3

20 g of acetoxystyrene monomer, 12 g of maleic anhydride and 1.28 g of azoisobutyronitrile are dissolved in o-xylene (150 ml) and degassed with nitrogen at room temperature. The reaction flask is then heated to 70° C. for 16 hours. The polymer is precipitated out of solution. Tetrahydrofuran is added to dissolve the polymer. The polymer is found to only partially dissolve so N-methyl pyrrolidone is added until the polymer totally dissolves. 23 g of dodecyl amine is added and the mixture is stirred overnight at room temperature. The amine dissolves in the N-methyl pyrrolidone. The solution is then heated to 150° C. for 15 hours. The polymer is isolated by precipitating into water, filtering and drying. The polymer crosslinks upon drying. An isolated sample is analyzed by $C^{13}$ NMR and complete hydrolysis and imidization is indicated to yield:

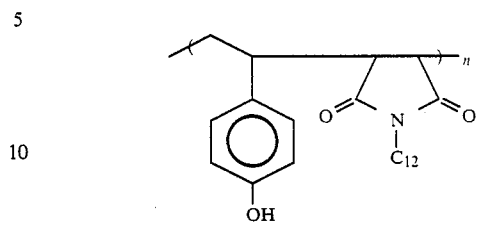

What is claimed is:

1. A surface active material comprising an alternating copolymer having the formula

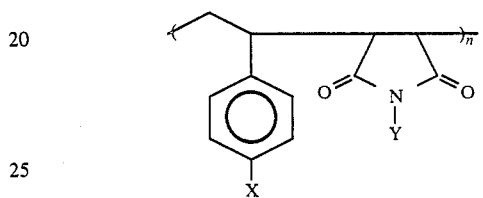

wherein X and Y respectively consist of a hydrophobic group and an ionic or non-ionic hydrophilic group,
wherein said hydrophobic group is selected from the group consisting of aliphatic, cycloaliphatic, aliphatic heterocyclic and $C_9$–$C_{18}$ amine groups; and wherein said hydrophilic group is selected from the group consisting of polyethylene oxide, copolymers of ethylene oxide-propylene oxide, $C_2$–$C_{10}$ aliphatic and aromatic sulfonate, and carboxylic acid groups, wherein said copolymer has a molecular weight in the range of from about 1,000 to about 500,000.

2. The material of claim 1 wherein Y is a copolymer of ethylene oxide-propylene oxide.

3. The material of claim 1 wherein Y is a polyethylene oxide group.

4. The material of claim 1 wherein Y is a $C_{12}$ primary amino group.

5. An electrically active material comprising an alternating copolymer having the formula

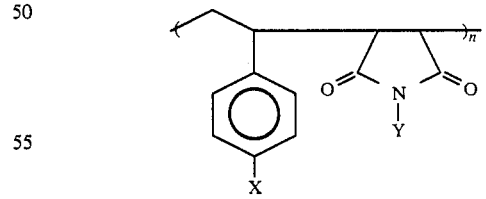

wherein X and Y oppositely consist of an electron accepting group and an electron donating group, wherein said copolymer has a molecular weight in the range of form about 1,000 to about 500,000 and wherein said electron donating group is selected from the group consisting of N,N-dimethyl phenylene diamine, alkoxy anilines, substituted aromatic amines and dimethoxy benzoic acid.

6. The material of claim 5 wherein said electron accepting group is 3,5-dinitrobenzoic acid.

7. The material of claim 5 wherein said electron accepting group is 3,5 dinitro aniline.

8. A method for producing a material comprising an alternating copolymer having the formula

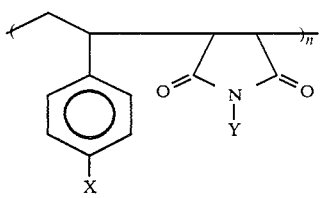

wherein X and Y oppositely consist of an electron accepting and an electron donating group; or a hydrophobic and an ionic or non-ionic hydrophilic group and wherein said copolymer has a molecular weight in the range of from about 1,000 to about 500,000, which method comprises reacting 4-acetoxystyrene with maleic anhydride in the presence of a free radical initiator to form poly(4-acetoxystyrene alt maleic anhydride), then reacting this product with a primary amine to form a poly(4-hydroxystyrene/N-alkyl or aryl maleimide), and then 4-substituting said hydroxystyrene such that said N substituent and said 4-hydroxystyrene substituents oppositely consist of an electron accepting and an electron donating group or oppositely a hydrophobic and an ionic or non-ionic hydrophilic group.

9. The method of claim 8 wherein X is a polyethylene oxide group.

10. The method of claim 8 wherein X is a copolymer of ethylene oxide-propylene oxide.

11. The method of claim 8 wherein Y is a $C_{12}$ primary amino group.

12. The method of claim 8 wherein said electron donating group is N,N-dimethyl phenylene diamine.

13. The method of claim 8 wherein said electron accepting group is 3,5-dinitrobenzoic acid.

14. The method of claim 8 wherein said electron accepting group is 3,5 dinitro aniline.

15. A surface active material comprising an alternating copolymer having the formula

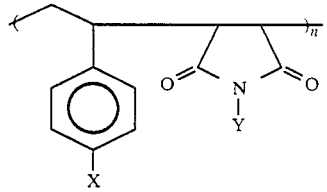

wherein Y and X respectively consist of a hydrophobic group and an ionic or non-ionic hydrophilic group, wherein said hydrophobic group is selected from the group consisting of aliphatic, cycloaliphatic, aliphatic heterocyclic and $C_9$-$C_{18}$ amine groups; and wherein said hydrophilic group is selected from the group consisting of polyethylene oxide, copolymers of ethylene oxidepropylene oxide, $C_2$-$C_{10}$ aliphatic and aromatic sulfonate, and carboxylic acid groups, wherein said copolymer has a molecular weight in the range of from about 1,000 to about 500,000.

16. The material of claim 15 wherein X is a copolymer of ethylene oxide-propylene oxide.

17. The material of claim 15 wherein X is a polyethylene oxide group.

18. The material of claim 15 wherein Y is a $C_{12}$ primary amino group.

* * * * *